United States Patent [19]

Kinoshita

[11] 3,954,451
[45] May 4, 1976

[54] METHOD FOR THE MANUFACTURE OF MERCURY FREE SULFURIC ACID

[75] Inventor: Hisahiro Kinoshita, Tokyo, Japan

[73] Assignees: Mitsui Mining & Smelting Co., Ltd.; Hachinohe Smelting Co., Ltd., both of Tokyo, Japan

[22] Filed: Sept. 6, 1972

[21] Appl. No.: 286,712

[30] Foreign Application Priority Data

| Sept. 10, 1971 | Japan | 46-70625 |
| Feb. 28, 1972 | Japan | 47-20820 |
| Feb. 29, 1972 | Japan | 47-21384 |
| Apr. 24, 1972 | Japan | 47-41633 |

[52] U.S. Cl. .................... 75/108; 423/210; 423/531; 423/561
[51] Int. Cl.² ............. C22B 43/00; C01B 17/90
[58] Field of Search ............ 75/108, 109, 121; 423/522, 101, 210, 531, 242; 55/72

[56] References Cited
UNITED STATES PATENTS

| 935,337 | 9/1909 | Thwaites | 423/101 |
| 940,595 | 11/1909 | Herreshoff | 423/242 |
| 1,915,270 | 6/1933 | Clark | 423/531 |
| 2,846,305 | 8/1958 | Aswey et al. | 423/101 |
| 2,958,572 | 11/1960 | Kraich et al. | 423/531 |
| 3,145,080 | 8/1964 | Jockers et al. | 423/531 |
| 3,147,074 | 9/1964 | Maurer | 423/522 |
| 3,677,696 | 7/1972 | Bryk et al. | 423/210 |
| 3,689,217 | 9/1972 | Capaul | 423/531 |
| 3,695,838 | 10/1972 | Kneffer et al. | 75/108 |
| 3,701,651 | 10/1972 | Hack et al. | 75/109 |
| 3,826,819 | 7/1974 | Orlandini et al. | 423/531 |

FOREIGN PATENTS OR APPLICATIONS

| 2,025,389 | 3/1971 | Germany | 423/531 |
| 1,054,972 | 4/1959 | Germany | 423/531 |
| 1,216,263 | 5/1966 | Germany | 423/531 |
| 742,052 | 12/1955 | United Kingdom | 423/242 |
| 191,495 | 1/1967 | U.S.S.R. | 75/121 |

Primary Examiner—Oscar R. Vertiz
Assistant Examiner—Gary P. Straub
Attorney, Agent, or Firm—Woodhams, Blanchard and Flynn

[57] ABSTRACT

A method of manufacturing sulfuric acid free of impurities such as mercury by the contact process, which comprises the steps: scrubbing the roasting gas coming out of a mist Cottrell with sulfuric acid having a concentration of 30 to 99% and a temperature of more than 20°C within one or two mercury absorption towers (the drying tower per se may suffice) or further within an additional mercury absorption tower disposed on the outlet side of the main blower; and adding a reagent such as a sulfide, a hydrosulfide compound of alkali metal or alkaline earth metal, hydrogen sulfide, selenium compound, sulfur, etc., or a metal more active than mercury in ionization series, to the sulfuric acid used in scrubbing to thereby precipitate and separate the heavy metals — particularly mercury — contained in the sulfuric acid as solid matter such as mercury sulfide, mercury selenide, mercury metal or amalgam; thereby making it possible to utilize the resulting sulfuric acid free of impurities as the exchange acid or directly take out as an end product.

8 Claims, 6 Drawing Figures

METHOD FOR THE MANUFACTURE OF MERCURY FREE SULFURIC ACID

BACKGROUND OF THE INVENTION a. Field of the Invention

The present invention relates to a method of manufacturing sulfuric acid free of heavy metals, particularly mercury.

b. Description of the Prior Art

According to the general method of manufacturing sulfuric acid by the contact process, the gas coming out of the roasting furnace is refined by flowing it through a waste heat boiler, cyclone, dust Cottrell, cooling tower, washing tower, gas cooler and mist Cottrell, in that order, and the thus refined gas is deprived of its moisture by means of a drying tower, and is converted into $SO_3$ through a group of convertors, and is then absorbed in sulfuric acid within the absorption tower to become a 98° sulfuric acid.

In manufacturing sulfuric acid nowadays, the sulfides of nonferrous metals such as copper, lead, zinc, etc. are often employed as the raw material. Such a material ore sometimes contains substances which are hard to remove by the conventional apparatus, such as fluorine compound, mercury, etc. as impurities.

Particularly, mercury cannot be removed by the aforesaid refining apparatuses: it is apt to be introduced into the drying tower and mixed with the sulfuric acid, though in a very small quantity, resulting in contamination of the product sulfuric acid through the exchange acid to be supplied to the absorption tower. The presence of mercury, though in a very small quantity, in the sulfuric acid poses a problem from the viewpoint of public nuisance inasmuch as the sulfuric acid is employed as an industrial material in large quantities in various fields of industry. Accordingly, there has been a need for development of a method of manufacturing sulfuric acid which method is effective for removing mercury concurrently.

As a method of manufacturing sulfuric acid by the contact process to meet this demand, the mercury removing treatment method for high-temperature roasting gas disclosed by the Outokumpu OY Patent Application (First Publication No. 2206/1972) is known. According to this method (hereinafter referred to as Outokumpu method), the high-temperature roasting gas coming out of a hot Cottrell is introduced into the sulfatizer, wherein sulfatization is effected to precipitate mercury as a sulfate; the precipitate recovered is washed by water; the iron, zinc sulfates, etc. are separated by virtue of the differences in their solubility in water, whereby mercury, selenium, etc. which are hard to dissolve in water are recovered. On this occasion, the water-soluble substances are returned to the roasting furnace in the form of an aqueous solution. In this connection, the roasting gas (namely, $SO_2$ gas) having undergone said sulfatization still contains mercury to the extent of about 0.2 mg/N m³. The gas coming out of the sulfatizer is washed with 30% diluted sulfuric acid by means of a venturic scrubber and thereafter sent to the mist Cottrell of the next process.

The foregoing Outokumpu method is admittedly capable of producing sulfuric acid by efficiently removing mercury from the roasting gas and concurrently recovering the separated mercury. According to this method, however, the temperature of the circulated acid is controlled by an external heat exchanger to prevent the circulated acid from being diluted by absorbing the moisture of the roasting gas on the occasion of sulfatization, and the sulfuric acid enters the sulfatizer at a temperature of 40° C and comes out of the sulfatizer at a temperature of 180° C. The roasting gas is controlled to enter the sulfatizer at a temperature of 350° C and come out of the same at a temperature of 180° C. The temperature of the sulfuric acid and roasting gas is so high that it is difficult to choose an appropriate material for the sulfatizer, heat exchanger, etc. Especially, in case of the presence of fluorine concurrently contained therein, the interior of the sulfatizer is apt to corrode and, therefore, it must be often repaired by suspending the operation of the sulfatizer. Not only that, the dust which is not removed by the hot Cottrell is apt to scatter and react with sulfuric acid in the sulfatizer of the Outokumpu method to produce to $ZnSO_4$, $FeSO_4$, $CaSO_4$ and the like, which may deposit within the pipes when sulfuric acid is cooled and cause such troubles as clogging of pipes and so on.

SUMMARY OF THE INVENTION

The inventors of the present invention have energetically examined the method of manufacturing sulfuric acid by the contact process utilizing the roasting gas that comes from the process of roasting nonferrous metal sulfide material, such as zinc, lead and as a result, they have succeeded in avoiding the troubles of the Outokumpu method and come to accomplish the present invention.

The principal object of the present invention is to provide a method of manufacturing sulfuric acid free of heavy metals, particularly mercury, through the contact process, which is capable of efficiently removing, separating and recovering heavy metals, particularly mercury from the roasting gas.

Another object of the present invention is to provide a method of manufacturing sulfuric acid, which is capable of removing mercury from the roasting gas through the process of scrubbing the roasting gas at a low temperature with a low-temperature sulfuric acid without causing any trouble with respect to the material of the sulfatizer (that is, drying tower or mercury absorption tower according to the present invention), heat exchanger, etc.

A further object of the present invention is to provide a method of manufacturing sulfuric acid, which renders it possible to perform the scrubbing without any trouble even in case of a roasting gas incapable of treatment by the Outokumpu method, that is, when the concentration of the recycling acid cannot be maintained above the concentration of 80% sulfuric acid because of such conditions as the moisture content and the temperature of the gas and/or when a considerable portion of the uncollected dust flies into the sulfatizer because the dust-collecting efficiency of the dust Cottrell is poor.

The present invention, which is based on the finding of the inventors of the present invention that mercury contained in sulfuric acid at less than 80% concentration can be easily removed as mercury sulfide, relates to a method of manufacturing sulfuric acid which is characterized by the use of drying tower means (consisting of 1 to 2 towers) or one mercury absorption tower disposed on the outlet side of the main blower in addition to said drying tower, for the purpose of performing the scrubbing therein under the condition that the concentration of sulfuric acid being 30 to 99% and the temperature being more than 20° C, then adding a reaction reagent to the acid thus made to absorb heavy metals, particularly mercury, and maintained to have the concentration of less than 80% to thereby remove mercury, and thereafter introducing the thus treated acid into the absorption tower as the exchange acid or directly taking it out as the end product.

In other words, the present invention relates to a method of manufacturing sulfuric acid by applying the conventional contact process, which is characterized in that: the low-temperature roasting gas coming out of a mist Cottrell is introduced into the tower of the acid-manufacturing system to be subjected to scrubbing with sulfuric acid having the concentration of 30 to 99% and the temperature of more than 20°C, preferably in the range of 20 to 70° C, thereby making the acid absorb and dissolve the water, mercury and others contained in the gas; next adding a reagent such as the sulfide, polysulfide, etc. of alkali metal or alkaline earth metal to the sulfuric acid used in said scrubbing treatment to thereby precipitate and separate heavy metals, particularly mercury contained in the sulfuric acid as mercury sulfide of mercury selenate; and employing the resulting impurity-free sulfuric acid as the exchange acid or, as occasion demands, directly taking it out as a mercury free sulfuric acid. On the occasion of adding said reagent, the concentration of sulfuric acid in the drying tower is preferably less than 80%. However, in case the concentration of sulfuric acid in the mercury absorption tower (drying tower per se will do), that is, the circulated acid, is as high as 98 to 99%, it is further effective to add a metal more active than mercury ionization series, such as aluminum, zinc, selenium, etc. in the form of a fine powder or other forms instead of the aforesaid reagent, thereby removing mercury by separation and precipitation thereof and taking out the resulting sulfuric acid as the end product.

BRIEF DESCRIPTION OF THE DRAWING

In the appended drawings,

FIG. 1 and FIG. 2 respectively are the flow sheets of the apparatuses for use in manufacturing sulfuric acid through refining of $SO_2$ gas by means of the mercury absorption tower (drying tower per se may suffice) disposed next to the mist Cottrell.

FIG. 3 is the flow sheet of the apparatus for use in manufacturing sulfuric acid through refining $SO_2$ gas arranged so as to exchange the acid in the drying tower for the acid in the absorption tower and control the quantity of the acid to be thus exchanged.

FIGS. 4 to 6 are the flow sheets of the apparatuses for use in manufacturing sulfuric acid through further refining $SO_2$ gas coming from the drying tower by disposing the mercury absorption tower next to the main blower, respectively.

DETAILED DESCRIPTION OF THE INVENTION

To elucidate the present invention, in an apparatus for use in manufacturing sulfuric acid by the contact process, the roasting gas ($SO_2$ gas) is subjected to scrubbing with sulfuric acid having a concentration of 30 to 99% and the temperature of more than 20°C — preferably in the range of 20 to 70°C — within the drying tower disposed next to the mixt Cottrell (or the mercury absorption tower disposed between the mist Cottrell and the drying tower, which may be called the 1st drying tower) to thereby make the sulfuric acid dissolve and retain the mercury and other impurities contained in the roasting gas. (In this connection, in case the concentration of the sulfuric acid is high, a part of mercury percipitates as mercury sulfate.) As a result, the acid used in scrubbing is contaminated with mercury and other impurities. Therefore, a portion of this scrubbing acid (i.e., circulated acid) is drawn out, and at least one member selected from the group of reagents consisting of $Na_2S$, $NaSH$, $Na_2S_x$, $H_2S$, $K_2S$, $Na_2SeO_4$, S, Se compound is added in the required quantity, whereby mercury is made to precipitate as mercury sulfide or mercury selenide. The thus precipitated mercury sulfide or mercury selenide is recovered as mercury through treatment by the known methods such as separation and filtration. On this occasion, it is desirable to perform the addition of said reagent in the presence of silver ion (Ag ion), copper ion (Cu ion), etc. capable of accelerating the precipitation of mercury sulfide or mercury selenide. As the precipitation accelerator to be added to the foregoing used scrubbing acid for the purpose of supplying silver ion or copper ion prior to the addition of the reagent such as $Na_2S$, $NaSH$, etc., there are Ag, $Ag_2S$, Cu, $CuSO_4$ and the like. By virtue of the foregoing process, the mercury removing efficiency is further improved. Especially when the concentration of the scrubbing acid is as high as more than 80% and the mere addition of such reagent as $Na_2S$ is insufficient for realizing a satisfactory mercury removing efficiency, the addition of said precipitation accelerator is very advantageous.

The roasting gas undergone the scrubbing treatment with sulfuric acid is $SO_2$ gas practically free of impurities, and this gas is sent in the drying tower (which may be called the 2nd drying tower) or the group of convertors. Meanwhile, by utilizing the scrubbing acid (that is, Hg-free acid) after removing the impurities precipitated by virtue of the addition of such reagent as $Na_2S$, etc. and the precipitation accelerator as an additional acid for the absorption tower, a 98% sulfuric acid not contaminated with mercury is produced. In this context, it goes without saying that the 98% sulfuric acid produced in the absorption tower can be supplied to the drying tower or mercury absorption tower as the exchange acid. On this occasion, the acid in the mercury absorption tower (the drying tower per se may suffice) may be directly taken out as a mercury-free product acid upon treating with the aforesaid reagent.

Generally speaking, the higher the concentration and temperature of the scrubbing sulfuric acid, the higher becomes the rate of removal of mercury from the roasting gas as is well known. The higher the concentration of sulfuric acid containing mercury absorbed therein, the lower becomes the rate of removal of mercury by virtue of the addition of the reagent. Also, an increase of temperature in order to accelerate the filtration is not always advisable from the industrial point of view because it involves difficulties with respect to the applicable material. Therefore, according to the foregoing method of manufacturing sulfuric acid, the roasting gas is subjected to scrubbing with sulfuric acid having the concentration of 30 to 99% and a temperature of more than 20°C to effect demercuration. And, from the practical point of view, it is desirable to apply the scrubbing acid having the concentration of less than 95% — preferably 77% or thereabout — and the temperature of 35° to 40°C, and make the acid in the absorption tower have the concentration of 98 to 99% and the temperature of 60° to 80°C or thereabout. Yet, it is possible to perform the demercuration sufficiently even when the concentration of the scrubbing acid is about 98%.

In this connection, the relation between the applicable reagent and the concentration and temperature of the acid examined through tests is as shown in the following.

As is evident from the above showing, when the concentration of acid is less than 80%, the Hg removal rate is remarkably enhanced.

Test 1-(b).

| Concentration of acid | % | 77 | | 98 | |
|---|---|---|---|---|---|
| quantity of reagent applied | % | 0.1 | 0.2 | 0.1 | 0.2 |
| concentration of Hg — original acid | ppm | 66 | 66 | 31 | 31 |
| concentration of Hg — treated acid | ppm | 2.2 | 1.5 | 2.8 | 2.2 |
| Hg removal rate | % | 97 | 98 | 90 | 91 | reagent: $Na_2S$
temperature of acid: 70°C

The above showing verifies that, when the concentration of acid is less than 80%, the mercury removal rate is superior.

Test 2.
(In case of application of hydrogen sulfide or sulfur as the reagent)

| Concentration of acid | % | 98 | 98 | 77 | 77 | 77 | 77 |
|---|---|---|---|---|---|---|---|
| reagent | | $H_2S$ | S | S | S | $H_2S$ | $H_2S$ |
| concentration of Hg — original acid | ppm | 12 | 31 | 66 | 34 | 56 | 66 |
| concentration of Hg — treated acid | ppm | 3 | 13 | 52 | 31 | 1 | <1 |
| Hg removal rate | % | 75 | 58 | 9 | 9 | 98 | >98 |

In the case of application of $H_2S$ as the reageant and the concentration of acid being 77%, the mercury removal rate is superior. In order to obtain a product acid to be free of generation of $Na_2SO_4$, it is advisable to employ $H_2S$ as the reagent Test 3.
(Relation between the temperature of acid and the speed of filtration)

| temperature of acid | filter aid (diatomaceous earth) | time of filtration | concentration of Hg (ppm) | Hg removal rate (%) |
|---|---|---|---|---|
| | | (min) (sec) | | |
| 20°C | — | 12.55 | 0.3 | 99 |
| " | 0.025 g | 7.30 | 0.3 | 99 |
| 40°C | — | 4.20 | 1.3 | 96 |
| " | 0.025 g | 3.50 | 0.3 | 99 |
| 60°C | — | 2.15 | 1.8 | 95 |
| " | 0.025 g | 3.15 | 0.2 | 99.5 |

Test 1-(a).
(Relation between the mercury removal rate and the concentration of acid)

| Concentration of acid | % | 66 | 77 | 83 | 98 |
|---|---|---|---|---|---|
| concentration of Hg — original acid | ppm | 47 | 56 | 39 | 12 |
| concentration of Hg — treated acid | ppm | 1 | 1 | 4 | 4 |
| Hg removal rate | % | 98 | 98 | 90 | 67 | reagent: $Na_2S$
applied quantity: 20 times as much as Hg by equivalent
temperature of acid: 30°C
filtration: by means of glass filter 3G-4

As to the filtration of the acid containing precipitates such as mercury, etc., the speed of filtration is remarkably enhanced by raising the temperature of the acid. Addition of a filter aid such as diatomaceous earth and the like improves the filtration efficiency too.

filter: 3G-4
reagent: Na₂S
heating: for 3 minutes
original acid: concentration of Hg = 30 ppm
concentration of acid = 77%

Test 4.
(Relation between the quantity of sodium sulfide applied and the mercury removal rate)

| quantity of reagent applied | % | 0.005 | 0.02 | 0.04 | 0.10 |
|---|---|---|---|---|---|
| rate of reagent to Hg by equivalent | | 3 | 13 | 25 | 62 |
| concentration of Hg — original acid | ppm | 41 | 41 | 41 | 41 |
| — treated acid | ppm | 22 | 14 | 3 | 1 |
| Hg removal rate | % | 46 | 66 | 93 | 98 |

Test 5.
(Selenium addition test)

| quantity of Se added | 50 ppm | 100 ppm |
|---|---|---|
| Hg removal rate | 98% | 99% |

Conditions:
After adding Na₂SeO₄ to the original acid, SO₂ is added. The concentration of Hg in the original acid: 65 ppm This notwithstanding, as will be understood from the showing of the following Test 6, application of a precipitation accelerating reagent capable of making copper ion or silver ion exist in the scrubbing acid (i.e., original acid) can remarkably enhance the mercury removal rate even when the concentration of acid is more than 80%.

Test 6
(Relation between the concentration of acid and the mercury removal rate in case of application of a precipitation accelerating reagent)

| | | No. 1 | No. 2 | No. 3 | No. 4 | No. 5 | No. 6 |
|---|---|---|---|---|---|---|---|
| reagent applied | quantity required for precipitation (by equivalent) | Na₂S 100 | Na₂S 100 | Na₂S 50 | Na₂S 50 | Na₂S 200 | Na₂S 400 |
| | quantity employed for the purpose of accelerating precipitation (ppm) | Cu 20 | Cu 50 | Ag 1 | Ag 3 | Ag 5 | — |
| acid | concentration (%) | 98 | 98 | 98 | 98 | 98 | 98 |
| | temperature (°C) | 60 | 60 | 30 | 30 | 30 | 30 |
| kind of filter aid | | diatomaceous earth | diatomaceous earth | diatomaceous earth | diatomaceous earth | diatomaceous earth | diatomaceous earth |
| Hg contained in original acid (ppm) | | 32.8 | 32.8 | 28.7 | 28.7 | 26.7 | 26.7 |
| Hg contained in treated acid (ppm) | | 4.1 | 2.4 | 6.2 | 3.2 | 0.7 | 8.0 |
| Hg removal rate (%) | | 87.5 | 92 | 78.1 | 88.1 | 97.4 | 70.0 |

The inventors of the present invention have continued their study on the above described method of manufacturing sulfuric acid and confirmed that the concentration and temperature of the scrubbing acid can be well controlled by replacing said scrubbing acid with the acid of the absorption tower. They have also confirmed that when a metal more active than mercury in ionization series is added to the undiluted sulfuric acid containing mercury dissolved therein and the mixture is subjected to agitation, preferably rapid agitation, a substitution reaction expressed by the following formula progresses and mercury ion can be separated and precipitated and mercury metal, whereby mercury contained in the sulfuric acid can be completely removed.

$$Hg^{2+} + Me \rightarrow Me^{2+} + Hg$$

wherein Me represents such metal as Zn, Al, Se, etc. This cementation reaction is frequently utilized at the time of refining ZnSO₄ solution in general zinc electrolysis and others, but its application to the refining of a high-concentration sulfuric acid such as in the present invention is unprecedented. And, in case the concentration of the scrubbing acid is more than 80%, particularly as high as 98 to 99%, it is more effective to add a metal more active than mercury in ionization series in lieu of said reagent to thereby remove mercury through separation and precipitation. Further, according to the present method, as set forth above, 98% sulfuric acid is produced in the absorption tower and this 98% sulfuric acid is added as the exchange acid for the drying tower (or mercury absorption tower), while the acid of the absorption tower can be replaced with the acid of the foregoing mercury absorption tower (or drying tower) and the quantity of the acid of both towers for replacement can be controlled, so that the concentration or the temperature or both of them of the scrubbing sulfuric acid can be always stabilized and Hg in $SO_2$ gas can be removed more effectively. In this way, it becomes possible to raise the temperature or the concentration or both of the temperature and concentration of the acid of the mercury absorption tower (the drying tower per se may suffice). In the prior art, especially the increase of concentration of the scrubbing acid (circulated acid) is attended with difficulties in effecting sulfatizing and filtration, but, according to the above described cementation method, such troubles can be easily settled.

Further, according to this method, the treating temperature covers a wide range and needs no particular limitation, but the higher the temperature, the higher the speed of cementation. As to the quantity of the metal to be added, it will do to add it by a quantity in excess of the minium required and thereafter adjust it by taking the purity of sulfuric acid into consideration. The increase in quantity of the metal thus added naturally results in an increase in the removal speed as well as removal rate of Hg.

The relation between the metal to be added and the concentration of acid examined through tests is as shown in the following.

As is evident from the above showing, zinc, selenium, copper, etc. in addition to alluminium are also effective in removing mercury contained in sulfuric acid As elucidated in the foregoing, the present invention relates to a method of manufacturing sulfuric acid, wherein: $SO_2$ gas coming out of a mist Cottrell and containing a small quantity of mercury is subjected to scrubbing with a sulfuric acid satisfying the conditions that it be possessed of high concentration or high temperature or possessed of both high concentration and high temperature by virtue of replacement of the acid with that of the absorption tower, thereby raising the rate of absorption of mercury, etc. of said sulfuric acid; $Na_2S$ or the like is added to the scrubbing acid containing mercury, etc. to convert mercury, etc. into sulfide, or, in case of employment of a high-concentration sulfuric acid in particular, a metal more active than mercury in ionization series is added to said scrubbing acid to convert mercury, etc. into metal, amalgam, etc., to be followed by, filtration and separation; and the thus purified acid is then utilized as the exchange acid to manufacture the intended sulfuric acid.

By virtue of application of the above method, the product sulfuric acid contains an extremely small quantity of mercury. However, in order to further decrease the mercury content of the product sulfuric acid, an additional mercury absorption tower is disposed on the outlet side of the main blower for the purpose of introducing $SO_2$ gas coming out of the drying tower (mercury absorption tower per se will do) to the group of convertors so as to subject $SO_2$ gas to scrubbing with Test 7.
(Relation between the concentration of acid and the mercury removal rate in case of application of a metal more active than mercury in ionization series)

| Test No. | | Unit | No. 1 | No. 2 | No. 3 | No. 4 |
|---|---|---|---|---|---|---|
| concentration of acid | | % | 66 | 77 | 85 | 98 |
| concentration of Hg | original acid | ppm | 23.7 | 29.7 | 8.5 | 7.0 |
| | treated acid | ppm | 0.6 | 1.5 | 1.6 | 0.6 |
| Hg removal rate | | % | 97.4 | 95.0 | 81.2 | 91.5 | metal applied (reagent): 0.03% of aluminium powder
temperature of acid: 27°C
filtration: by means of the glass filter 3G-4

As is evident from the above showing, even when the concentration of acid is raised, no great difference is seen in the mercury removal rate.

sulfuric acid having the concentration as high as 70 to 99%, preferably 98% and the temperature as high as 40°C — preferably 70° to 100°C, to thereby collect mercury remaining slightly in $SO_2$ gas into sulfuric acid.

Test 8.
(Relation between the mercury removal rate and the quantity of metal applied)

| Test No. | | Unit | No. 1 | No. 2 | No. 3 | No. 4 | No. 5 | No. 6 | No. 7 |
|---|---|---|---|---|---|---|---|---|---|
| metal powder applied | kind | | Al powder | Al powder | Al powder | Al powder | Zn powder | Se powder | Cu powder |
| | quantity | % | 0.03 | 0.05 | 0.1 | 1 | 1 | 0.04 | 0.05 |
| acid | concentration | % | 98 | 98 | 98 | 98 | 98 | 98 | 98 |
| | temperature | °C | 30 | 30 | 30 | 30 | 30 | 30 | 30 |
| agitation | | min. | 1 | 5 | 5 | 1 | 1 | 60 | 30 |
| Hg contained in original acid | | ppm | 26.7 | 26.7 | 26.7 | 28.7 | 28.7 | 26.7 | 27.2 |
| Hg contained in treated acid | | ppm | 8.8 | 3.3 | 1.1 | 0.7 | 1.9 | 2.1 | 3.8 |
| Hg removal rate | | % | 67.0 | 87.6 | 95.9 | 97.6 | 93.3 | 92.1 | 86.0 |

Remark:
Metal powder is granular, about 70% of said powder being in the range of from −200 to +325 mesh.

(In this connection, when the concentration of acid is high, a portion of mercury precipitates as mercury sulfate.) A part of this sulfuric acid, which has been contaminated with mercury, etc. though slightly, is drawn out and used as the exchange acid for the drying tower to remove the impurities contained therein to produce undiluted sulfuric acid as set forth in the foregoing. By virtue of such double or triple stages of $SO_2$ gas refining by means of the drying tower and mercury absorption tower, mercury and other impurities are almost completely removed and a high-purity sulfuric acid is obtained. In this connection, in case it is necessary to raise the temperature of the gas and acid, a heat exchanger may be disposed on this side of the mercury absorption tower.

On the occasion of practically manufacturing sulfuric acid by the present method employing the mercury absorption tower, the roasting gas is subjected to scrubbing with sulfuric acid having the concentration of 30 to 99% and the temperature of more than 20°C in the drying tower (mercury absorption power per se will do) disposed next to the mist Cottrell to thereby catch mercury, etc. contained in the roasting gas in said sulfuric acid. Subsequently, the roasting gas let out of said drying tower is sent into the mercury absorption tower by the working of the main blower (via the heat exchanger if necessary). On this occasion, the temperature of the gas is raised by the blower to be higher than the temperature at the outlet of the drying tower. This mercury absorption tower is of the same shape as said drying tower and is so constructed as to stand the gas pressure of 1000 to 3000 mm W.G. and the roasting gas is again subjected to scrubbing with a high concentration, high temperature sulfuric acid herein as set forth above and then is led to the group of convertors as a refined $SO_2$ gas free of mercury and other impurities almost to perfection. Meanwhile, a part of the circulated acid of said drying tower and a part of the circulated acid of the mercury absorption tower are drawn out, and mercury contained in the acid drawn out is recovered by the above described mercury-removing method, that is, (1) a required quantity of at least one member of the aforementioned group of reagents such as $Na_2S$, NaSH, etc. is added to said acid in the presence or non-presence of Cu ion or Ag ion to precipitate mercury contained in the circulated acid as mercury sulfide or mercury selenide to be filtered and separated, or (2) a required quantity of at least one member of the group of powders of metals more active than mercury in ionization series, such as aluminium, zinc, selenium, copper, etc. is added in the presence or non-presence of copper ion or silver ion to be followed by agitation — preferably rapid agitation — to precipitate mercury ion contained in the circulated acid as metal and amalgam to be filtered and separated. The thus refined mercury-free sulfuric acid is utilized as the additional acid for the absorption tower. In this connection, another part of the recycling acid of the mercury absorption tower may be introduced into said drying tower. The temperature of $SO_2$ gas to be introduced to said mercury absorption tower may be controlled by means of a heat exchanger utilizing the heat of reaction at the time of conversion of $SO_2$ to $SO_3$. However, as set forth above, the temperature of $SO_2$ gas usually rises sufficiently on the occasion of adiabatic compression of $SO_2$ gas by the main blower. Besides, as the temperature of the recycling acid of the mercury absorption tower approximates the temperature of the gas being introduced therein, the temperature of $SO_2$ gas can be adjusted by controlling the temperature of gas to be in a condition suitable for removal of mercury. As described above, according to the method of the present invention, the $SO_2$ gas containing a very small quantity of mercury, etc. which has been led from the mist Cottrell is subjected to scrubbing with sulfuric acid or with an acid satisfying the condition that it be possessed of high concentration or high temperature or both high concentration and high temperature by virtue of exchanging with the acid of the absorption tower to enhance the rate of mercury, etc. absorbed in said acid, and then $Na_2S$, $Na_2SeO_4$ or the like is added to this acid containing mercury, etc. to precipitate said mercury, etc. as sulfide or selenide, or, particularly in case of employing a high-concentration sulfuric acid, a metal more active than mercury in ionization series is added to precipitate mercury, etc. as mercury metal, etc., to be followed by filtration and separation, and the resulting pure acid is employed as the exchange acid for the absorption tower to produce sulfuric acid.

Unlike the Outokumpu method, the present method employs the mercury absorption tower disposed in the acid making series, so that the temperature of $SO_2$ gas is as low as 35°C or thereabout, the concentration of acid is in the range of 30 to 99%, the temperature of acid usually suffices to be as low as 20° to 70°C, and there is no trouble in respect of the material of the apparatus. Besides, when compared with the Outokumpu method, the quantity of impurities (such as Zn, Pb and Cu) contained in the gas is small, so that there is no fear of the dissolved impurities educing and clogging the pipe line at the time of cooling the acid. Accordingly, the removal of mercury can be performed efficiently, and the quantity of impurities in the product sulfuric acid becomes extremely small, for instance, the mercury content can be reduced to less than 1 ppm. Moreover, by virtue of disposing the mercury absorption tower in the vicinity of the outlet of the main blower and treating the roasting gas coming out of the drying tower in the thus disposed mercury absorption tower, the impurities in the product sulfuric acid can be further minimized.

Further, the present invention has such merits that it renders it possible to provide plenty of circulated acid and to perform the scrubbing with an acid of fixed concentration free of dilution with water. Not only that, the acid of the mercury absorption tower suffices to be replaced with the acid of other towers in small quantities, but an acid cooler is not required. In other words, the present method is characterized by the mercury absorption tower which can be independently maintained at a suitable condition in terms of the concentration as well as the temperature of acid.

Besides, the present method, when compared with the Outokumpu method has such additional merits that the absorption tower for the purpose of demercuration can be installed near the group of drying/absorption towers, is easy to inspect, can employ a common circulating pump, and renders it possible to adjust the condition for demercuration by the use of a heat exchanger, so that it is indeed a profitable method of manufacturing sulfuric acid effective in removing mercury by absorption.

Hereunder will be given several examples embodying the method of the present invention.

DESCRIPTION OF THE PREFERRED EMBODIMENTS

EXAMPLE 1

Figure 1:
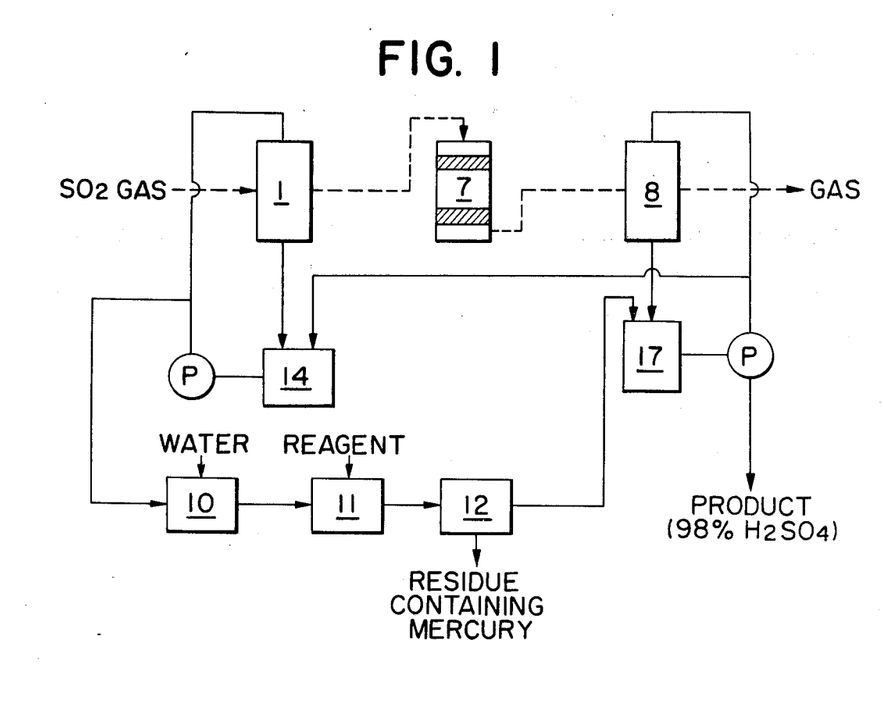
FIGS. 1 to 6 are flow sheets showing the essential equipment for manufacturing sulfuric acid by contact process respectively according to the method under the present invention.

The roasting gas generated in a fluid roasting furnace for use in treating zinc sulfide ore is passed through the boiler, cyclone, hot Cottrell, cooling tower, washing tower, gas cooler and mist Cottrell in order, and then is led to the drying tower (which concurrently functions to refine the demercurated acid) shown in the flow sheet of the sulfuric acid manufacturing equipment in FIG. 1, wherein a very small quantity of mercury as contained in the $SO_2$ gas is made to dissolve and be retained in a sulfuric acid having the concentration of 93 to 95% to exist therein as mercury sulfate, etc. On this occasion, as the acid is apt to be diluted with the saturated water of the $SO_2$ gas, the concentration is maintained by virtue of the acid having the concentration of 98 to 99% supplied from the absorption tower 8, and, in exchange for the acid thus supplied, a part of the diluted acid of the drying tower (that is, acid contaminated with mercury and other heavy metals) is refined by the demercuration method of the present invention and drawn out to be added to the absorption tower 8 as the exchange acid. In other words, a part of the circulated acid within the drying tower 1 is drawn out and then water is added to the extent of permitted limit of the water balance to lower the concentration, a reagent such as $Na_2S$, $Na_2SeO_4$, S, etc. is added and then mercury is precipitated to be followed by filtration and separation, or after adding a precipitation accelerating reagent and next a reagent such as $Na_2S$, etc., mercury is precipitated to be followed by filtration and separation, and the resulting mercuryfree acid is applied to the absorption tower 8 in place of water to absorb $SO_3$ within said tower, whereby a 98% sulfuric acid free of mercury is manufactured. In this connection, in the appended drawings, the numeral reference 7 denotes the convertor, 10 denotes the storage tank (dilution tank), 11 denotes the reaction tank, 12 denotes the filter, 14 denotes the circulating tank for the drying tower, 17 denotes the circulating tank for the absorption tower, and P denotes the pump.

EXAMPLE 2

Figure 2:
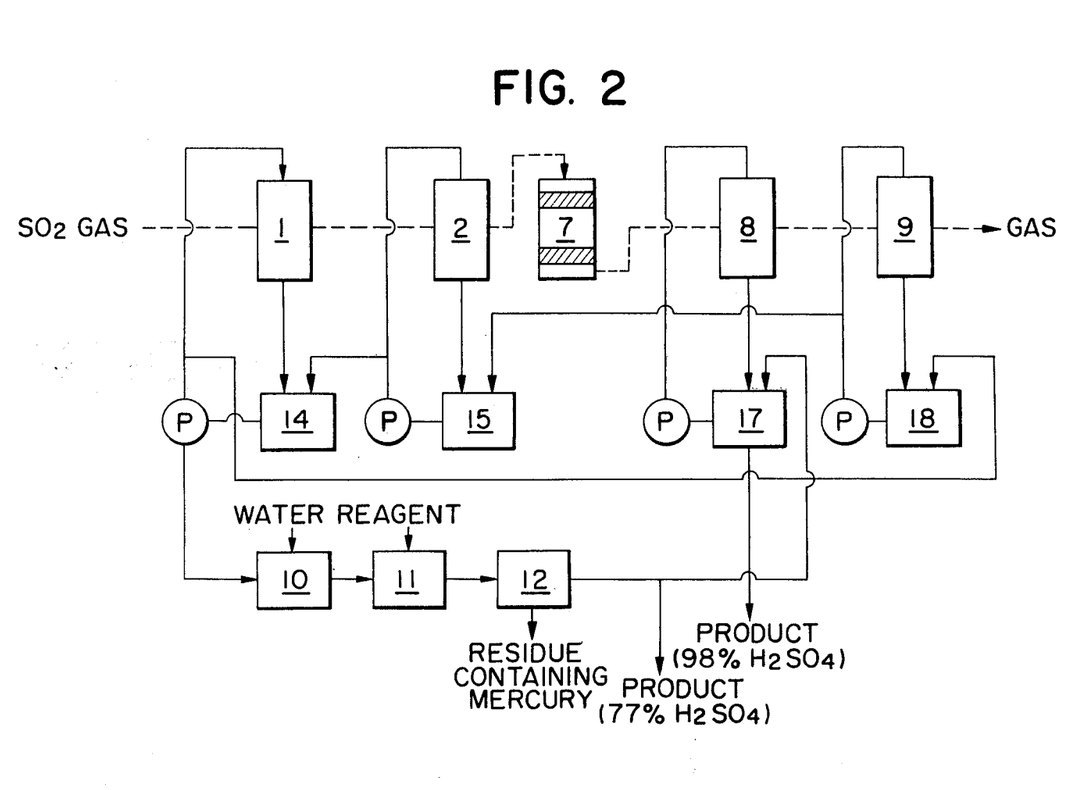

The $SO_2$ gas generated at the time of manufacturing sintered ores by means of a sintering plant employing the sulfide or oxide of zinc and lead as the material is passed through the hot Cottrell, cooler, washing tower, and mist Cottrell in order in the same way as in Example 1, and then is led to the mercury absorption tower (the 1st drying tower per se may suffice) 1 and the drying tower (the 2nd drying tower per se may suffice) 2 shown in the flow sheet of the sulfuric acid manufacturing equipment in FIG. 2, whereby Hg, As, etc. contained in the $SO_2$ gas is made to dissolve in the circulated sulfuric acid of the mercury absorption tower and a part of said sulfuric acid thus made to absorb Hg, As, etc. is drawn out to serve as the additional acid for the absorption tower according to the conventional method of exchanging acid. (On this occasion, the concentration of sulfuric acid is, for instance, 77%.) Subsequently, upon leading the sulfuric acid thus drawn out to the reaction tank 11, a reagent such as $Na_2S$, etc. is added to said acid either directly or after adding a precipitation accelerating reagent to make silver ion or copper ion exist in advance, whereby mercury is converted into mercury sulfide to be removed by filtration. In this connection, it will do to perform the addition of said precipitation accelerating reagent in the circulating tank 14 for the mercury absorption tower. In order to avoid the leak of fine precipitates in the filter 12, it is desirable to use a filter employing diatomaceous earth and the like. As to the temperature of acid at the time of filtration, the higher it is, the higher the speed of filtration, but from the viewpoint of simplicity of applicable material and other operational conditions, it is preferable to be less than 70°C. By virtue of the addition of the mercury removal process according to the present invention, the product sulfuric acid having the concentration of 98% as drawn out of the 1st absorption tower 8 while conducting the exchange of acid among the mercury absorption tower 1, drying tower 2 and 2nd absorption tower 9, is free of mercury.

It is also possible to obtain a product sulfuric acid having the concentration of, for instance, 77% free of mercury through the process of adding the reagent to the sulfuric acid drawn out of the mercury absorption tower 1 and removing mercury by filtration. By utilizing this 77% sulfuric acid in place of water to be added to the 1st absorption tower 8 and making it absorb $SO_3$ within said tower, it is possible to obtain a product sulfuric acid having the concentration of 98%. In this connection, the numeral reference 15 in the appended drawings denotes the circulating tank for the drying tower (2nd drying tower per se may suffice) 2, and 18 denotes the circulating tank for the 2nd absorption tower.

EXAMPLE 3.

| | | Sulfuric acid demercuration performance (Mercury removal performance by $Na_2S$ in case of employing a filter having filtration area of 30 m²) | | | |
|---|---|---|---|---|---|
| Item | Test No. | 1 | 2 | 3 | 4 |
| original acid | concentration of sulfuric acid (%) | 78.02 | 77.67 | 77.24 | 77.30 |
| | Hg content (ppm) | 3.58 | 32.2 | 22.4 | 28.8 |
| kind of filter aid | | diatomaceous earth | diatomaceous earth | diatomaceous earth | diatomaceous earth |
| quantity of filter aid employed | g/m² | 1.33 | 1.00 | 1.00 | 1.00 |
| rate of $Na_2S$ to original acid | % | 0.1 | 0.07 | 0.05 | 0.05 |
| Hg content of treated | ppm | <0.01~0.55 | <0.1~0.3 | <0.1~0.2 | <0.1~0.2 |
| Hg removal rate | % | >99 | >99.1 | >99.3 | |

Sulfuric acid demercuration performance
(Mercury removal performance by Na$_2$S in case of
employing a filter having filtration area of 30 m$^2$)

| Item | Test No. | 1 | 2 | 3 | 4 |
|---|---|---|---|---|---|
| quantity of acid subjected to filtration | t | 85~99.7 198.3 | 74.9 | 68.5 | 87.2 |
| time required for filtration | hr | 14°15' | 16°30' | 18°20' | 11°25' |
| mean filtration speed | T/hr/m$^2$ | 0.463 | 0.151 | 0.124 | 0.255 |
| pressure for starting filtration | kg/cm$^2$ | 2.1 | 1.6 | 2.4 | 3.0 |
| maximum pressure | " | 4.0 | 3.9 | 3.9 | 4 |

EXAMPLE 4

Figure 3:
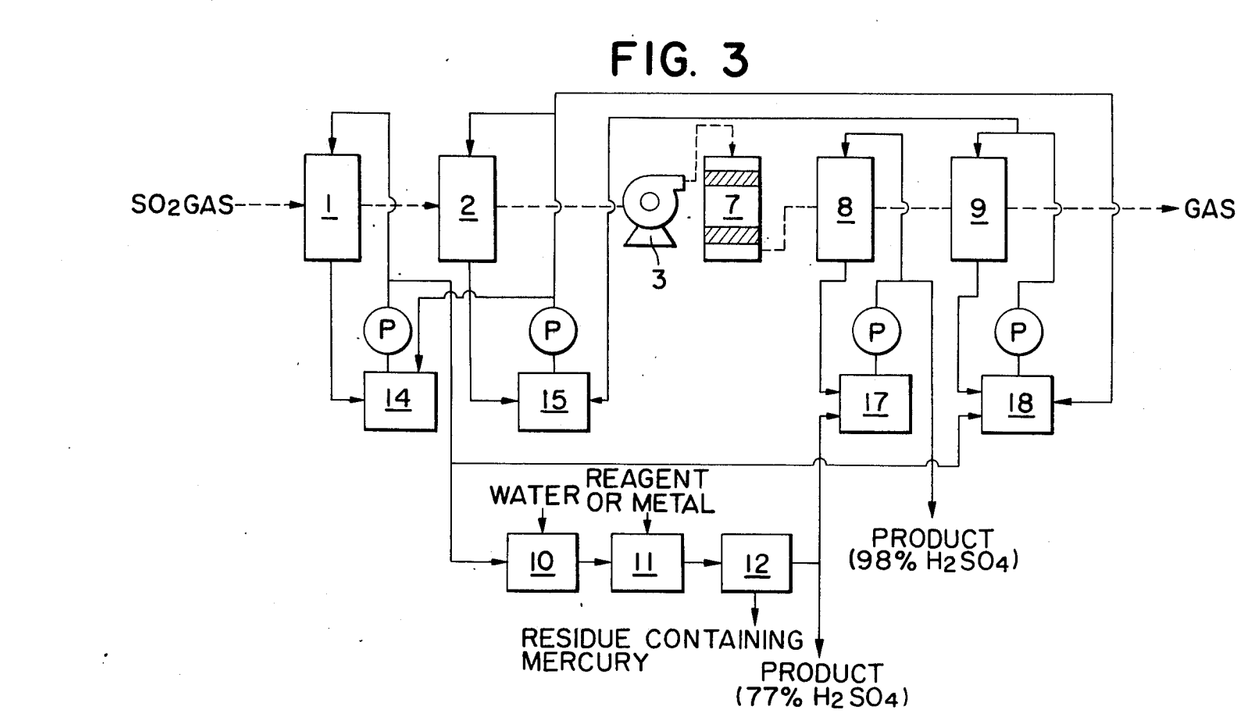

The SO$_2$ gas generated in the same way as in Example 2 is passed through the mist Cottrell and led to the 1st drying tower (mercury absorption tower may suffice) 1 and the 2nd drying tower 2 shown in the flow sheet of the sulfuric acid manufacturing equipment in FIG. 3, where mercury, arsenic etc. contained in the SO$_2$ gas is first made to dissolve and catch in the circulated sulfuric acid of the drying tower and a part of said sulfuric acid thus made to absorb mercury, arsenic, etc. is drawn out to serve as the additional acid for the absorption tower according to the conventional method of exchanging acid. Upon leading the sulfuric acid thus drawn out to the reaction tank 11, a reagent is added to said acid to convert mercury into mercury sulfate or mercury selenate to be removed by filtration. (When said circulated acid is of high concentration, the powder of a metal more active than mercury in ionization series or the like is added in lieu of the reagent.) It also will do to perform the addition of said reagent in the circulating tank 14 for the 1st drying tower. The SO$_2$ gas thus becomes free of mercury and other impurities is led to the blower 3, convertor 7, 1st absorption tower 8 and 2nd absorption tower 9 in order. While the acid exchange is effected among the 1st drying tower 1, 2nd drying tower 2 and 2nd absorption tower 9, in order to raise the concentration or the temperature or both the concentration and temperature of said circulated acid of drying tower, exchanging of the acid of the circulating tank 18 for the 2nd absorption tower 9 with that of the circulating tank 15 for the 2nd drying tower 2 is performed and, at the same time, the quantity of acid to be replaced is adjusted.

EXAMPLE 5

Figure 4:
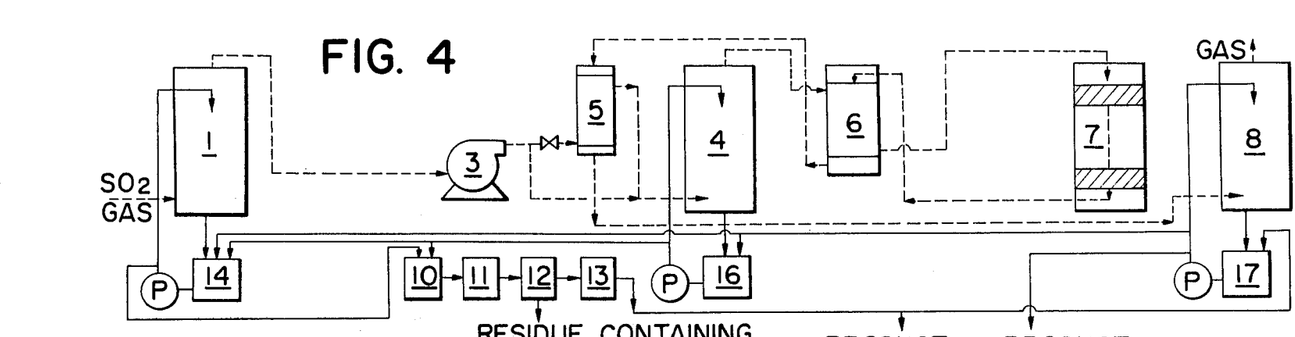

The roasting gas generated by a fluid roasting furnace for use in treating zinc sulfide ore is first subjected to dust removing by means of the boiler and cyclone and then is led to the drying tower (which concurrently functions in demercuration refining) 1 shown in the flow sheet of the sulfuric acid manufacturing equipment in FIG. 4 through the hot Cottrell, cooling tower, washing tower and mist Cottrell in order. On this occasion, the conditions of the gas are as follows: Gas volume=600 Nm$^3$/min, So$_2$ content = 6.5%, temperature of gas at the inlet of drying tower 1 = 30° C, and mercury content = 10 mg/Nm$^3$. In this drying tower 1, about 80% of mercury contained in the SO$_2$ gas in a very small quantity is dissolved and caught in a 95% sulfuric acid (scrubbing acid temperature: 35° C) to stay therein as mercury sulfate, etc. Subsequently, the SO$_2$ gas is introduced into the mercury absorption tower 4 by means of the main blower 3. The thus introduced SO$_2$ gas is increased in pressure by virtue of said main blower 3, so that the temperature of gas rises 10° ~ 20° C higher than the temperature at the outlet of drying tower 1 due to adiabatic compression, and the gas enters the mercury absorption tower 4 at the temperature of 70° C. In this connection, it also will do to raise the temperature of the acid by means of the heat exchanger 5 at the time of introducing it into said mercury absorption tower 4. In this mercury absorption tower 4, the SO$_2$ gas is subjected to scrubbing with a 98% sulfuric acid (acid temperature: 65° C), whereby 95% of mercury contained in the gas in a very small quantity and failed to be caught by the drying tower 1 is caught. In other words, mercury contained in the supplied SO$_2$ gas comes to be absorbed in the scrubbing sulfuric acid within the drying tower 1 and the mercury absorption tower 4 to the extent of 80% + 20% × 95% = 99.0%. The gas coming out of the mercury absorption tower 4 is raised in temperature by means of the heat exchanger 6 usually consisting of more than one unit, is led to the convertor 7 to be subjected to oxidation therein, then is led to the absorption tower through the heat exchangers 6 5 so as to make it absorb the SO$_3$ gas generated in the convertor 7, and is thereafter discharged into the air.

As the scrubbing acid for use in the mercury absorption tower 4, it is preferable to apply a part of the circulated acid drawn out of the absorption tower 8, but it also will do to apply a part of the circulated acid of the drying tower 1 or the acid undergone purification by the demercuration equipment. The gas to be introduced into the mercury absorption tower 4 has already been deprived of water by means of the drying tower 1, so that the circulated acid in the mercury absorption tower 4 is free of dilution and maintains a fixed concentration. The circulated acid contaminated within the mercury absorption tower 4 is either supplied to the circulating tank 14 for the drying tower or stored in the storage tank 10 for the mercury removal equipment. A reagent is added to the sulfuric acid draw out to convert mercury into mercury sulfide to be removed by filtration with the filter 12. (When the circulated acid is of high concentration, the powder of a metal more active than mercury in ionization series is added in place of the reagent.) It also will do to apply the reagent directly to the circulating tank 14 for the drying tower or the circulating tank 16 for the mercury absorption tower. In order to avoid the leak of fine precipitates, it is desirable to use a filter employing diatomaceous earth and the like. The mercury removal efficiency of the present filter 12 has proved to be 99.5%. The acid thus freed of mercury is employed as the additional acid for the absorption tower 8, producing a 98% sulfuric acid at the rate of 171 kg/min, and the mercury content of the product is as small as 0.5 ppm. In this context, said acid free of mercury may be drawn out as a product acid having the concentration of 77% or thereabout. It is to be noted that the mercury content of a sulfuric acid manufactured without applying the method of the present invention is in the range of 35 ~ 40 ppm.

EXAMPLE 6

Figure 5:
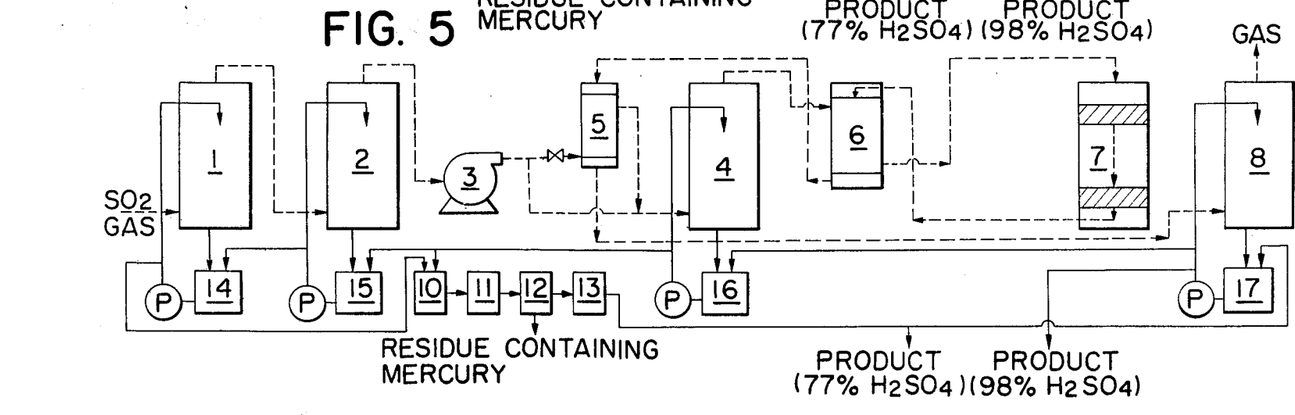

In the same way as in Example 4, the $SO_2$ gas generated by a roasting furnace is previously cleaned while passing the boiler, cyclone, hot Cottrell, cooling tower, washing tower, mist Cottrell and so on, and then is introduced into the 1st drying tower 1 shown in the flow sheet of the sulfuric acid manufacturing equipment in FIG. 5. On this occasion, the conditions of the gas at the inlet of said tower are as follows: Gas volume = 1000 $Nm^3$/min, $SO_2$ content = 6.4%, temperature of gas at the inlet = 30° C, and mercury content = 5.83 mg/$Nm^3$. In this 1st drying tower 1, the gas is subjected to scrubbing with a 77% sulfuric acid circulating therein as well as drying. Next, the gas is introduced into the 2nd drying tower 2, where it is subjected to scrubbing with a 96% sulfuric acid (acid temperature: 38° C), its water content is removed and mercury contained in it is dissolved in the sulfuric acid, whereby the quantity of mercury in the gas at the outlet of this tower becomes 1.05 mg/$Nm^3$ and the mercury absorption rate is 82%. The gas coming out of the 2nd drying tower 2 is next introduced into the mercury absorption tower 4 by means of the main blower 3. On this occasion, the temperature of gas at the inlet of the mercury absorption tower 4 is 83° C, and the dropping temperature of the circulated acid in this tower to dissolve and caught mercury contained in the gas in a very small quantity which failed to be caught by the drying tower 2 is 76° C. As a result of absorption by this mercury absorption tower 4, mercury content of the gas at the outlet of the tower becomes 0.06 mg/$Nm^3$ and the mercury absorption rate is 94%. The gas coming out of the mercury absorption tower 4 is introduced into the convertor 7 through the conventional heat exchanger 6 for conversion from $SO_2$ gas to $SO_3$ gas, and, after absorption by a 98% sulfuric acid within the absorption tower 8, is discharged into the air. A part of the acid contaminated with mercury in the mercury absorption tower 4 is drawn out and introduced into the circulating tank 15 for the 2nd drying tower 2 or the storage tank 10 for the mercury removal equipment, whereby mercury is removed through the same process as in Example 4.

Besides, a part of the circulated acid of the absorption tower 8 is drawn out and added as the circulated acid of the mercury absorption tower 4.

A part of the circulated acid of the 2nd drying tower 2 is drawn out to serve as the additional acid for the circulating tank 14 for the 1st drying tower 1, and, as a substitute therefor, a part of the circulated acid of the 1st drying tower 1 is stored in the storage tank 10 for the mercury removal equipment, whereby mercury is separated and removed.

As a result of demercuration performed by means of the mercury removal equipment in the same way as in Example 1, 99.5% of mercury residue is separated and removed. The sulfuric acid free of mercury stored in the storage tank 13 for the mercury removal equipment is served as the additional acid for the absorption tower 8, producing a 98% sulfuric acid at the rate of 280 kg/min. The concentration of mercury in the product sulfuric acid on this occasion is 0.3 ppm.

EXAMPLE 7

Figure 6:
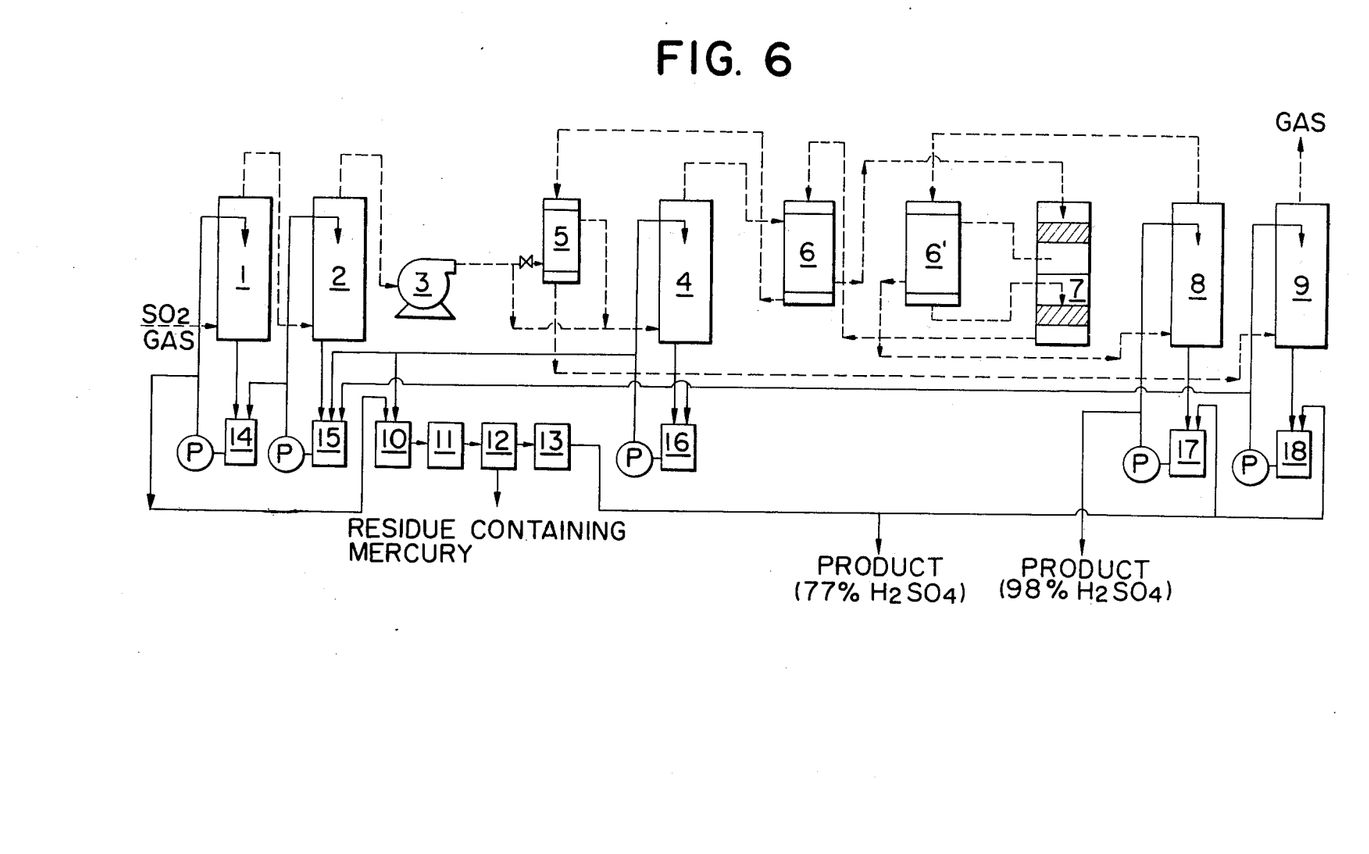

In the same way as in Examples 4 and 5, the $SO_2$ gas generated by a roasting furnace is first cleaned and then is introduced into the 1st drying tower 1 shown in the flow sheet of the double contact-process sulfuric acid manufacturing plant in FIG. 6. On this occasion, the conditions of the gas are as follows: Gas volume = 1000 $Nm^3$/min, $SO_2$ content = 6.7%, temperature at the inlet = 20° C, and mercury content = 13.9 mg/$Nm^3$. The concentration of the circulated sulfuric acid of the 1st drying tower 1 is 77% like in the case of Example 2. The gas subjected to scrubbing with this sulfuric acid in the 1st drying tower 1 is next subjected to scrubbing with a sulfuric acid having the concentration of 96% (acid dropping temperature: 32° C) in the 2nd drying tower 2, whereby the water contained in the gas is removed and further mercury contained in the gas is dissolved in the sulfuric acid. As a result, mercury content of the gas at the outlet of the drying tower 2 becomes 3.48 mg/$Nm^3$, and the mercury removal rate is 75%. The gas coming out of the 2nd drying tower 2 is introduced into the mercury absorption tower 4 by means of the main blower 3. The temperature of gas at the inlet of the mercury absorption tower 4 is 85° C, and the temperature of the circulated acid of this mercury absorption tower 4 at the time of dropping is 75° C. A very small quantity of mercury contained in the gas which has failed to be caught by the 2nd drying tower 2 is dissolved and caught in this recycling acid, so that mercury content of the gas at the outlet of the mercury absorption tower 4 becomes 0.17 mg/$Nm^3$ and the mercury absorption rate is 95%. The gas coming out of the mercury absorption tower 4 is introduced into the double contact-type convertor 7 through the conventional heat exchanger 6, and the gas converted by the 1st catalyst layer is introduced into the 1st absorption tower 8 through the intermediate heat exchanger 6' to thereby absorb $SO_3$ gas generated by the convertor 7, next is introduced into the 2nd catalyst layer of the convertor 7 through the heat exchanger 6' to thereby convert the remaining $SO_2$ gas, then is introduced into the 2nd absorption tower 9 through the heat exchangers 6 5 to thereby absorb the $SO_3$ gas, and thereafter is discharged into the air.

To serve as the scrubbing sulfuric acid in the mercury absorption tower 4, a part of the circulated acid of the 2nd absorption tower 9 having the concentration of 98.6% is drawn out, and, in place thereof, the acid contaminated with mercury is supplied to the circulating tank 15 for the 2nd drying tower 2 so as to maintain the concentration of the circulated acid of the 2nd drying tower 2 at 96%. Besides, in order to maintain the concentration of the circulated acid of the 1st drying tower 1 at 77%, a 96% sulfuric acid is supplied to the circulating tank 14 for the 1st drying tower as the additional acid through the outlet of the circulating pump of the 2nd drying tower. And, in exchange for this additional acid, a part of the circulated acid of the 1st drying tower 1 is drawn out to be stored in the storage tank 10 for the demercuration equipment. In this demercuration equipment, mercury content of the 77% sulfuric acid is separated and removed through the same operation as in Examples 1 and 2. The sulfuric acid thus purified in the demercuration equipment is either furnished to the circulating tanks 17 18 for the 1st absorption tower 8 and 2nd absorption tower 9 or directly taken out as the product. In order to obtain a product sulfuric acid having the concentration of 98%, a part of the circulated acid of the 1st absorption tower 8. In this way, it is possible to produce a sulfuric acid having the concentration of 77% at the rate of 87 kg/min and a sulfuric acid having the concentration of 98% at the rate of 229 kg/min, both products containing 0.8 ppm of mercury.

EXAMPLE 8

| | | Demercuration performance at mercury absorption tower that disposed on the outlet side of main blower | | | | |
|---|---|---|---|---|---|---|
| Item | | Test No. | 1 | 2 | 3 | 4 |
| condition of gas for mercury absorption tower | gas velocity | m³/m²/min | 34.4 | 34.4 | 35.0 | 24.0 |
| | temperature at inlet | °C | 73.0 | 70.5 | 80.5 | 77.5 |
| | at outlet | °C | 72.0 | 68.0 | 76.0 | 74.0 |
| | pressure at inlet | mmW.G. | 580 | 628 | 540 | 330 |
| | at outlet | " | 450 | 500 | 410 | 265 |
| | pressure drop | " | 130 | 128 | 130 | 65 |
| condition of acid | temperature of feed acid | °C | 75.0 | 69.0 | 79.0 | 76.0 |
| | concentration of feed acid | % | 98.74 | 98.71 | 98.71 | 98.16 |
| | acid circulating rate | l/min | 82 | 82 | 82 | 30–40 |
| Hg content of gas | at inlet | mg/m³ | 5.31 | 3.71 | 1.21 | 4.58 |
| | at outlet | mg/m³ | 0.14 | 0.25 | 0.03 | 0.31 |
| mercury absorption rate | | % | 97.2 | 96.8 | 97.5 | 93.2 |

What is claimed is:

1. In a method of manufacturing substantially mercury-free sulfuric acid, by roasting non-ferrous metal sulfide material and then removing dust, cooling, washing and removing mist from the roasted gas to prepare a cool feed gas containing $SO_2$ and impurities comprising water and mercury converting the $SO_2$ to $SO_3$ and absorbing the $SO_3$ in dilute sulfuric acid, the improvement which comprises the steps of:

continuously flowing a stream of said feed gas into and through scrubbing means and therein continuously scrubbing said feed gas with a continuously circulating stream of liquid scrubbing agent consisting essentially of sulfuric acid solution having an $H_2SO_4$ concentration of from 77 to 99 wt. % and having a temperature of from 20° to 70° C, to absorb impurities comprising water and mercury present in said feed gas into said scrubbing agent and to produce a stream of purified feed gas containing $SO_2$;

converting the $SO_2$ in said purified feed gas to $SO_3$ and then flowing said resultant $SO_3$-containing gas through absorption tower means and therein contacting said resultant gas with dilute sulfuric acid solution to absorb the $SO_3$ whereby to produce concentrated sulfuric acid solution;

continuously withdrawing a portion of said circulating scrubbing agent stream while continuing to circulate the balance of said scrubbing agent stream through said scrubbing means, adding to said withdrawn portion one or more precipitating agent selected from the group consisting of $Na_2S$, $NaSH$, $Na_2S_x$, $H_2S$, $K_2S$, $Na_2SeO_4$ and S, in an amount effective to precipitate the mercury present therein, together with a substance capable of making present in said withdrawn portion of said scrubbing agent silver ions or copper ions in an amount effective to accelerate the precipitation of mercury sulfide or mercury selenide in said withdrawn portion, removing the precipitated mercury sulfide or mercury selenide from said withdrawn portion of said scrubbing agent, recovering the balance of said withdrawn portion of said scrubbing agent as a purified dilute sulfuric acid solution, and utilizing at least a portion of said purified dilute sulfuric acid solution obtained from said withdrawn portion as the dilute sulfuric acid solution employed in said contacting step.

2. A method according to claim 1 in which the $H_2SO_4$ concentration of said withdrawn portion of said scrubbing agent is adjusted to be less than 80% before adding said precipitating agent thereto.

3. A method according to claim 1 in which said substance is selected from the group consisting of Ag, $Ag_2S$, Cu and $CuSO_4$.

4. A method according to claim 1 wherein said scrubbing agent has an $H_2SO_4$ concentration of about 77% and a temperature of 35° to 40° C.

5. A method according to claim 1 in which the $H_2SO_4$ concentration of said withdrawn portion of said scrubbing agent is more than 80% before adding precipitating agent thereto.

6. A method according to claim 5 in which said substance is selected from the group consisting of Ag, $Ag_2S$, Cu and $CuSO_4$.

7. In a method of manufacturing substantially mercury-free sulfuric acid, by roasting non-ferrous metal sulfide material and then removing dust, cooling, washing and removing mist from the roasted gas to prepare a cool feed gas containing $SO_2$ and impurities comprising water and mercury converting the $SO_2$ to $SO_3$ and absorbing the $SO_3$ in dilute sulfuric acid, the improvement which comprises the steps of:

continuously flowing a stream of said feed gas into and through scrubbing means and therein continuously scrubbing said feed gas with a continuously circulating stream of liquid scrubbing agent consisting essentially of sulfuric acid solution having an $H_2SO_4$ concentration of from more than 80 to 99 wt. % and having a temperature of from 20° to 70° C., to absorb impurities comprising water and mercury present in said feed gas into said scrubbing agent and to produce a stream of purified feed gas containing $SO_2$;

converting the $SO_2$ in said purified feed gas to $SO_3$ and then flowing said resultant $SO_3$-containing gas through absorption tower means and therein contacting said resultant gas with dilute sulfuric acid solution to absorb the $SO_3$ whereby to produce concentrated sulfuric acid solution;

continuously withdrawing a portion of said circulating scrubbing agent stream having an $H_2SO_4$ concentration of more than 80% while continuing to circulate the balance of said scrubbing agent stream through said scrubbing means, adding to said withdrawn portion a precipitating agent selected from the group consisting of aluminum metal, zinc metal and selenium metal in an amount effective to precipitate the mercury present therein together with a substance capable of making present in said withdrawn portion of said scrubbing agent silver ions or copper ions in an amount effective to accelerate the precipitation of mercury metal, removing the precipitated mercury metal from said withdrawn portion of said scrubbing agent, recovering the balance of said withdrawn portion of said scrubbing agent as a purified dilute sulfuric acid solution, and utilizing at least a portion of said purified dilute sulfuric acid solution obtained from said withdrawn portion as the dilute sulfuric acid solution employed in said contacting step.

8. A method according to claim 7 in which said substance is selected from the group consisting of Ag, $Ag_2S$, Cu and $CuSO_4$.

* * * * *